United States Patent [19]

Dexter et al.

[11] 4,074,284
[45] Feb. 14, 1978

[54] INK SUPPLY SYSTEM AND PRINT HEAD

[75] Inventors: John L. Dexter, Mountain View; Edmond L. Kyser, Portola Valley; Charles S. Mitchell, Palo Alto; Stephan B. Sears, Portola Valley, all of Calif.

[73] Assignee: Silonics, Inc., Sunnyvale, Calif.

[21] Appl. No.: 694,064

[22] Filed: June 7, 1976

[51] Int. Cl.$^2$ .......................................... G01D 15/16
[52] U.S. Cl. ................................................. 346/140 R
[58] Field of Search ................. 346/140 R, 75, 139 C, 346/145; 197/1 R

[56] References Cited

U.S. PATENT DOCUMENTS

| 1,770,493 | 7/1930 | Ranger | 346/76 R X |
| 3,708,798 | 1/1973 | Hildenbrand | 346/140 R |
| 3,787,880 | 1/1974 | Kattner | 346/140 R X |

FOREIGN PATENT DOCUMENTS

| 2,532,037 | 1/1976 | Germany | 346/140 |

Primary Examiner—Joseph W. Hartary
Attorney, Agent, or Firm—Limbach, Limbach & Sutton

[57] ABSTRACT

An interchangeable head system for an ink jet printer of the asynchronous, volume displacement droplet ejection type in which the print head is mounted on the print head carriage in a manner such that it may be readily detached and replaced with another head; the print head mounting allowing for adjustment of the distance from the print head nozzle to the print receiving medium. The ink supply connection to both the print head and the ink supply container includes means for automatically closing off the ink supply line to prevent either the loss of ink or the introduction of air into the container, supply and print head when either the print head or the container is removed from the system. The print head includes an ink supply pressure sensor for sensing the changes in pressure in the system and a valve operated by the sensor to supply ink to the system upon reduction of the pressure below a predetermined level.

7 Claims, 10 Drawing Figures

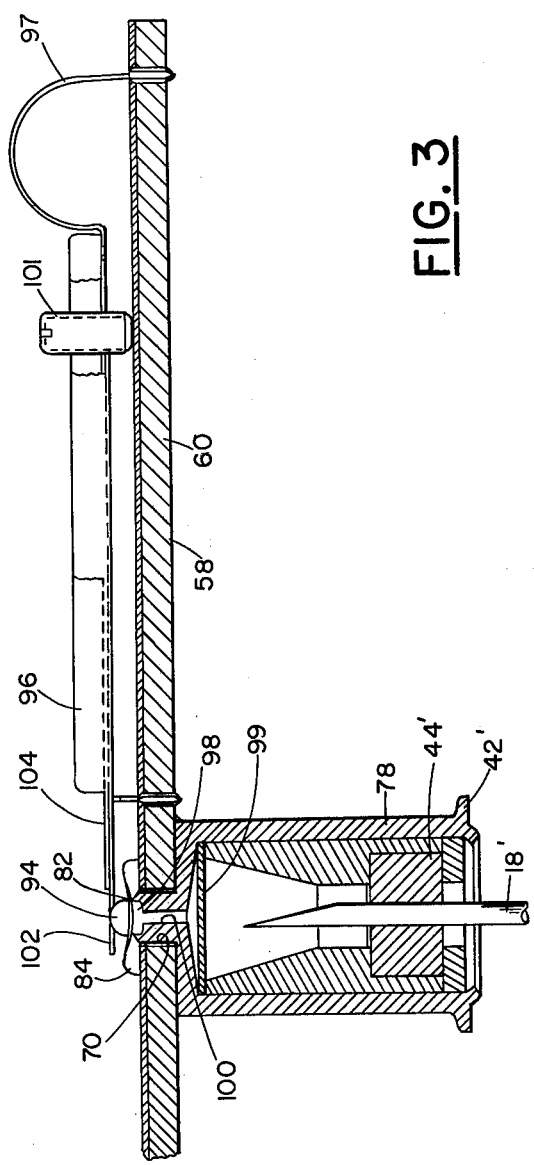
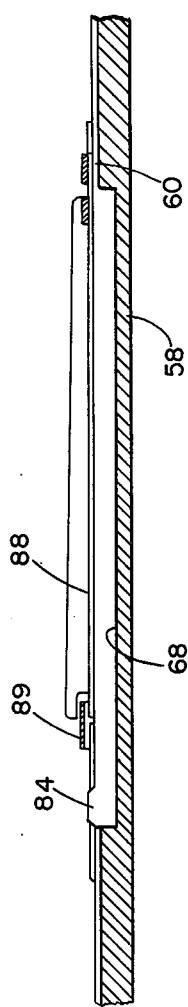
FIG. 3
FIG. 4

INK SUPPLY SYSTEM AND PRINT HEAD

BACKGROUND OF THE INVENTION

This invention relates to an ink jet printer of the asynchronous, volume displacement droplet type, and more particularly to an interchangeable print head system for such an ink jet printer.

Volume displacement ink jet printers have special ink supply requirements separate from and in addition to the requirements of "constant flow" ink jets. Since the only resupply mechanism for replacing expelled ink is capillary action, the ink supply pressure must be within the range of capillary pressure that can be generated by the print head nozzles. The preferred supply pressure is very slightly negative, perhaps the equivalent of 1 to 2 centimeters of water. This type of ink supply arrangement is discussed in U.S. Pat. Nos. 3,708,798; 3,747,120; 3,832,579; and 3,852,773.

Another important criteria for such ink jet printers arises from the low pressure requirement discussed above. Since the ink reservoir is typically connected directly to the print head to provide the low hydrostatic supply pressure, the system is vulnerable to pressure surges generated by the motion of the print head or the supply line due to inertial forces. Also, the usual arrangement of a volume displacement ink jet printer is to have a plurality of droplet ejection devices connected to the same ink supply. It thus becomes necessary to isolate the individual ejection devices from each other so that they can be independently actuated. This is done in some prior art devices by use of a pulse trap chamber which is partially filled with air to absorb pressure surges in the supply line and to isolate the individual rejection devices in the print head. See for example, U.S. Pat. No. 3,708,798. In one prior art device a passively activated valve is used to minimize the pressure surge effect by having the pressure surges themselves providing the actuating force for the valve. See, for example, U.S. Pat. No. 3,852,773. In still another prior art device, a pressure absorption mechanism is used for a single ink jet ejector so that self-generated resonances are minimized and the useful range of the device is extended to higher droplet ejection rates, see for example, U.S. Pat. No. 3,832,579.

Substantially all ink jet printing systems function best when there is no air or gas in the ink supply system or in the print head. This requirement is particularly severe for volume displacement printers since air bubbles will counteract the incompressible properties of the fluid and prevent the volume displacement mechanism from working properly. In some systems, chambers are provided for accumulating air bubbles before they reach the print head. See for example, U.S. Pat. Nos. 3,708,798 and 3,805,276. In one system, the air and gas are removed from the ink supply before it is used. See U.S. Pat. No. 3,346,869.

Another problem with many prior ink jet printer systems is that they are tuned uniquely for each print head. This makes ready replacement of defective print heads difficult and expensive. Not only must the system be retuned for the replacement ink jet print head, but the ink supply line must be flushed clear of any accumulated air which enters the system during the replacement process.

SUMMARY OF THE INVENTION

The above mentioned problems of maintaining a proper pressure in the ink supply, isolating it with respect to the various print head nozzles, eliminating gas bubbles and allowing for interchangeability of the print heads are overcome by the present invention of an improved ink jet printer of the type having an ink supply, an asynchronous volume displacement droplet ejection print head in fluid communication with the ink supply, and with the print head being mounted on a carriage which effects relative movement between the print head and the print receiving medium. The improvement of the invention comprises first means for removeably attaching the print head to the carriage means, including means for adjustably spacing the print head from the receiving medium, and second means integral with the first means for removeably connecting the print head to the ink supply. The second means includes means for blocking the introduction of air into and the loss of ink from the print head upon the removal of the print head from the carriage means. Third means integral with the first and second means, provide a removeable electrical interconnection with the print head. Each print head includes a preadjusted electrical signal conditioning means for adapting each print head to operate within predetermined system parameters when supplied with predetermined electrical signals through this third means.

In the preferred embodiment, the spacing between the print head and the paper is adjustable by rotating the print head about the hollow needle and having a set screw for fixing the rotational position of the print head about the hollow needle. The third means for electrically connecting the print head includes an edge connector which is integral with the print head and has a plurality of thick-filmed electrical traces screened onto the print head structure. An edge connector socket mounted on the first means establishes electrical connections with the electrical traces on the edge connector of the print head. Means are provided for connecting the edge connector socket with the preadjusted electrical signal conditioning means which typically include a plurality of resistors of predetermined resistances chosen for the particular print head.

The print head of the preferred embodiment includes driver crystals for causing the ejection of ink droplets. The print head is enclosed in a shell-like container which protects the print head from damage. The driver crystals are coated with a thin layer of insulating material and a relatively thick layer of sound dampening material is applied over the thin layer of insulating material. The shell-like housing structure is divided into two halves which are pressed together on opposite sides of the print head to encapsulate it together with the sound dampening material. The sound dampening material makes intimate physical contact with the drive crystals, the print head and the shell structure but does not hamper the operation of the drive crystals.

In the preferred embodiment, in order to meter the flow of ink to the print head, a pressure sensor and a valve are integrally incorporated into the print head. The pressure sensor detects changes in the fluid pressure in the pulse trap chamber and operates the valve to allow ink to flow to the pulse trap chamber upon the reduction of pressure below a predetermined level which is less than the maximum capillary pressure capable of being generated at the print head nozzles. This valve allows the maintenance of a substantially constant fluid pressure in the pulse trap chamber of the print head which feeds ink to the individual droplet ejection chambers of the print head. The ink source itself is at a higher pressure and includes a collapsible elastic balloon that supplies its own pressure through elastic action, without requiring external pumps or springs. Each component of the ink supply system, that is the high pressure source, the connecting lines, and the print head, is of a modular design and is easily disconnected from the other components. The connecting apparatus are such that no air enters the system on either connecting or disconnecting the system components and no ink is allowed to escape to the outside.

The pressure sensor and valve control system automatically compensate for the variations in the pressure of the high pressure source as the elastic force becomes less with removal of significant volumes of ink. When the high pressure source becomes exhausted, the control system generates a signal that disarms the printer, thereby preventing air from entering the nozzles because of an insufficient ink supply.

It is therefore an object of the present invention to provide an ink jet printer system having a readily interchangeable print head and ink supply;

It is another object of the invention to provide an ink jet printer system having an ink supply connection for a readily interchangeable print head which prevents either the loss of ink or the introduction of air into either the print head or the ink supply system upon the replacement of the print head;

It is still another object of the invention to provide an ink jet printer system in which the print heads are interchangeable and each includes its own associated electronic circuitry unique to that print head which may be removed simultaneously with the print head to adapt it to the system parameters;

It is a further object of the invention to provide an ink jet printer in which a substantially constant fluid pressure is maintained in the pulse trap chamber of the print head; and It is a still further object of the invention to provide an ink jet printer system which disarms the print head upon insufficient supply of ink so that no air is allowed to enter the print head nozzles due to the insufficient ink supply.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 3 is a sectional view taken generally along the lines 3—3 of FIG. 2 and showing the valve and ink inlet detail;

FIG. 4 is a sectional view taken generally along the lines 4—4 of FIG. 2 and showing the details of the pressure sensor beam;

DETAILED DESCRIPTION OF CERTAIN PREFERRED EMBODIMENTS

Figures 1A, 1B:
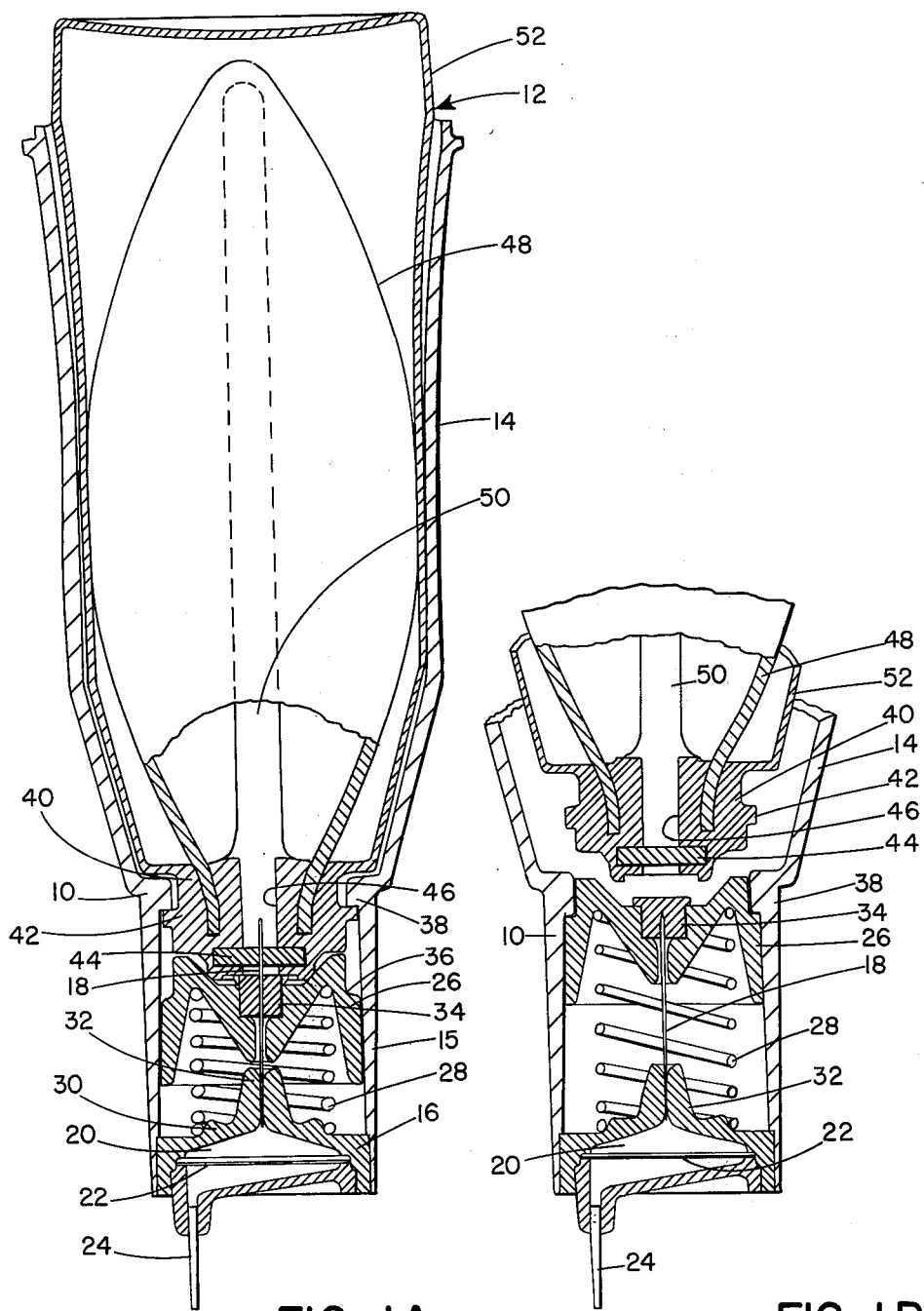
FIG. 1A is a vertical view, partly in section, of the ink supply system as assembled according to one embodiment of the invention.
FIG. 1B is a vertical view, partly in section, of the ink supply system depicted in FIG. 1A when disassembled.

Referring now more particularly to FIGS. 1A and 1B, the ink supply cartridge for the print head system of the invention is depicted. The ink supply comprises an ink cartridge receptacle 10 and a disposable cartridge 12 containing ink. Since the ink cartridge will be replaced frequently, perhaps 300 times over the life of the printing system, the receptacle 10 must be constructed to prevent ink leakage or air bubble infiltration and further to provide filtering for the ink. The basic construction of the receptacle 10 includes an outer, open ended cylindrical socket 14 for receiving the ink cartridge 12. At the closed ended neck 15 of the socket 14 is a cylindrical plug 16 in the center of which is mounted the blunt end of a hypodermic needle 18 which is aligned parallel to the longitudinal axis of the receptacle 14 and extending into the socket 14. The hollow needle 18 is open at the blunt end into a hollow space 20 below the plug 16 which is divided in half by a filter 22. A portion of the space 20 on the other side of the filter 22 from the needle 18 is in fluid communication with an outlet pipe 24.

The neck of the socket 14 which surrounds the plug 16 is hollow and has a cylindrical plug 26 slidably fitted within it above the plug 16. A compression spring 28 spans the space between the fixed plug 16 and the slidable plug 26 so as to urge the plug 26 upwardly as viewed in FIG. 1A. The spring 28 is centered around a circular shoulder 30 on the upper surface of the plug 16. The needle 18 is rigidly mounted in a protuberance 32 extending upwardly from the plug 16. A seal 34 is coaxially mounted within the movable plug 26 so that the needle 18 is aligned to penetrate it.

The plug 26 has an upper, annular indentation 36 which mates with a corresponding projecting shoulder 38 in the interior of the socket 14 at the point where the socket 14 flares outwardly to receive the outer diameter of the ink cartridge 12. The annular indentation 36 and the shoulder 38 act as a stop to prevent the spring 28 from pushing the movable plug 26 out of the top of the socket neck 15.

In operation, when the ink receptacle is removed, as viewed in FIG. 1B, the plug 26 is forced upwardly by the spring 28 so that the seal 34 covers the end of the hypodermic needle 18, thereby closing it off and preventing the loss of ink from the print head connected to the outlet 24 and to prevent the entry of air into the print head.

The ink cartridge 12 has a lower neck portion 40 having a protruding annular, interrupted shoulder 42. The projecting shoulder 38 of the socket 14 is also interrupted about its circumference so that the ink cartridge 12 is inserted into the receptacle with the neck portion 40 first and is then twisted until the shoulders 42 of the ink cartridge engage with the shoulder 38 of the socket, thereby locking the ink cartridge into the socket.

The two critical functions of the ink cartridge 12 are to store ink completely isolated from the atmosphere and to deliver the ink under sufficient pressure through the ink supply system to the pulse trap chamber in the print head such that the pulse trap pressure can be maintained at its required value during printing.

As best shown in FIG. 1A, the engaging neck portion 40 of the ink cartridge also includes a septum 44 mounted in the throat of a passageway 46 leading to the interior of an elastomeric bladder 48. When the ink cartridge 12 is inserted and locked into the socket 14, the bottom surface of the neck 40 depresses the plug 26 against the action of the spring 28 thereby sliding the seal 34 downwardly on the hypodermic needle 18. Simultaneously, the pointed end of the needle 18 punctures and penetrates through the septum 44 to provide fluid communication between the hollow space 20 and the interior of the bladder 48.

By means of the movable seal 34 and the septum 44, ink is prevented from leaking out of the bladder 48 upon the removal of the ink cartridge 12 from the receptacle 14 while the simultaneous covering of the needle 18 by the seal 34 prevents the introduction of air into the system beyond the needle and the leakage of ink from the needle. The filter 22 also helps to prevent the passage of air bubbles into the system as well as other types of particle contamination. The filter may be, for example, two centimeters in diameter with a five micron pore size.

When empty, the bladder is held in tension by a tension rod 50, located within the bladder 48, which projects upwardly from the base structure 40. The bladder 48 is contained within a hollow shell 52 for ease of handling. The bladder 48 is typically made of butyl rubber, for example, because the low gas and vapor transmission properties of butyl rubber. The septum 44 can be made of silicon rubber, for example, due to the superior sealing properties of such rubber.

To load the cartridge 12 with ink, a hollow needle is first inserted through the septum and all residual air inside the bladder is evacuated. The ink to be thereafter injected into the bladder is first deaired by vacuum and heat processes and is then injected into the collapsed bladder under pressure. When the bladder has been filled to capacity with the deaired and degassed ink, any residual air is drawn off through the hollow filling needle, which is then withdrawn. The cartridge 14 then can be used as a self-pressurized air free disposable ink source for the printer. A suitable cartridge for the present embodiment could contain 50 – 100 cubic centimeters of ink at a pressure of approximately 0.5 atmospheres and would be sufficient to print about 6,000,000,000 characters.

Figure 6:
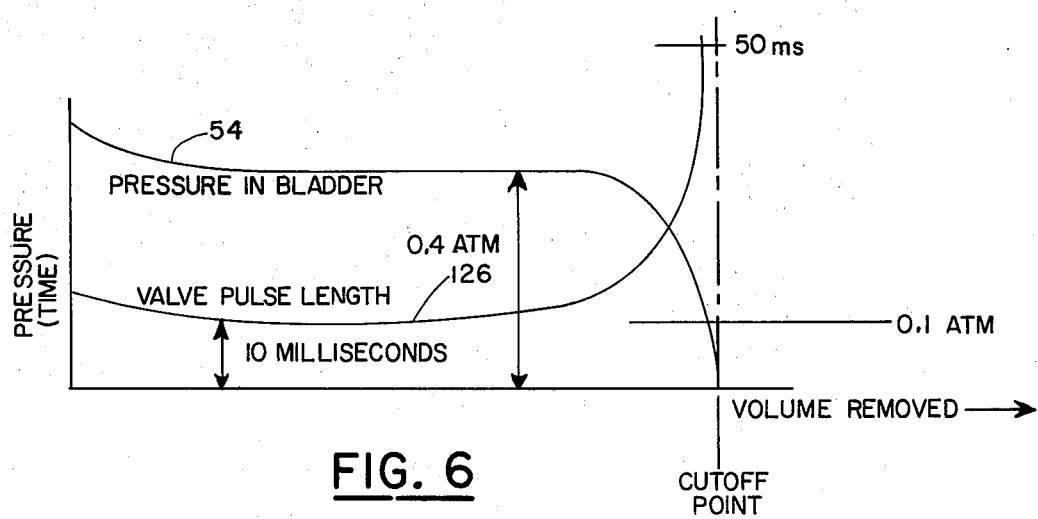
FIG. 6 is a diagram simultaneously illustrating both the pressure-valve pulse length relationship for the ink supply.

As ink is withdrawn from the cartridge 14, the internal pressure of the ink will vary as indicated by the curve 54 in FIG. 6. There is a point on the pressure curve, shown in the Figure as the "cut-off point", beyond which the container will not provide adequate flow of ink through the system to the print head. At that point, the cartridge should be removed and discarded and a new cartridge should be installed. A small amount of ink, perhaps 10% of the total volume, is not recoverable since the pressure falls below a predetermined minimum value programmed into the control system to be described in greater detail hereinafter. The magnitude of the volume of ink present in the bladder at this minimum value pressure is small due to the fact that the bladder is initially in tension due to the tension rod 50.

Figure 2:
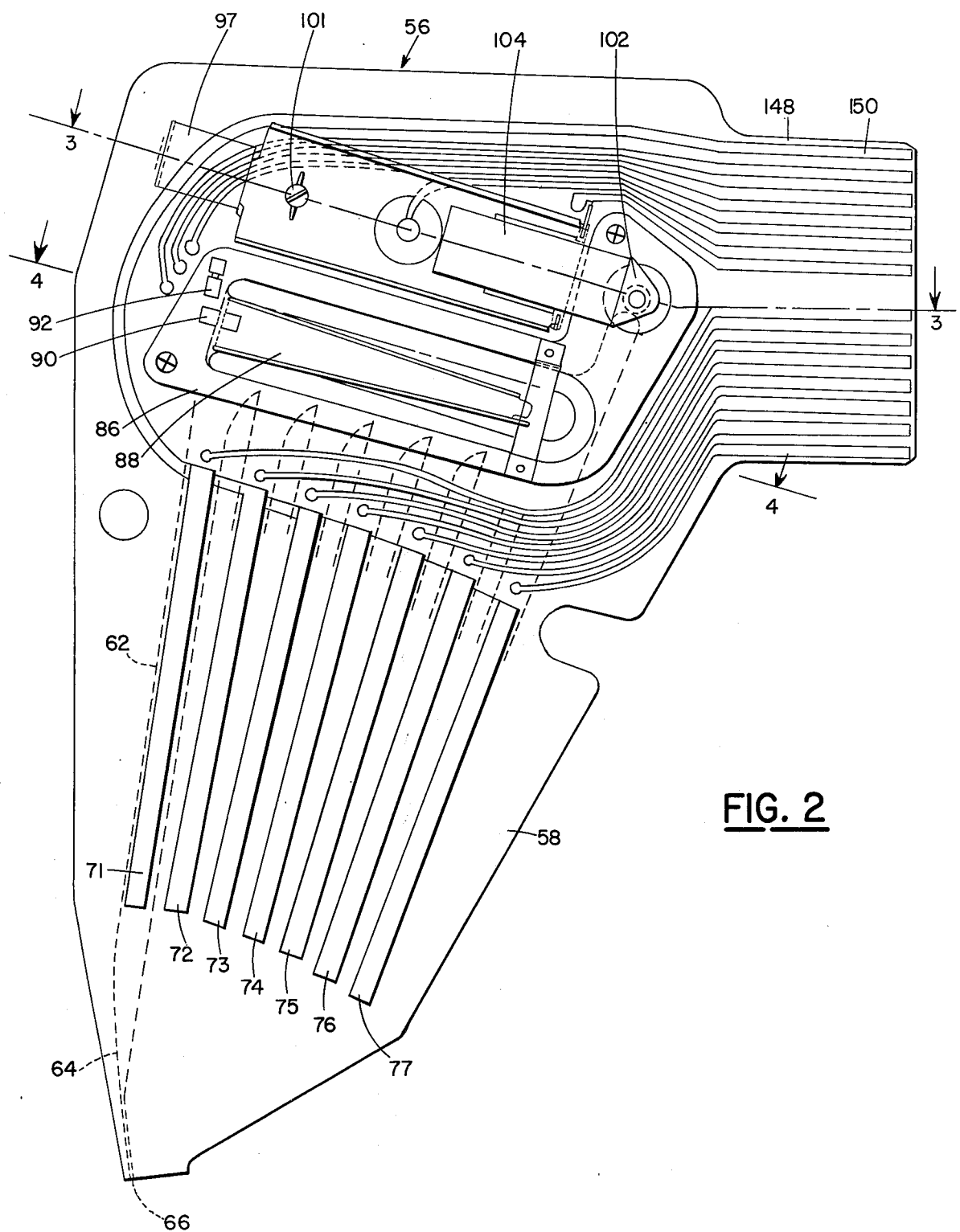
FIG. 2 is a side view of the print head according to one embodiment of the invention.

Referring now more particularly to FIGS. 2-4, the print head 56 of the system will be described in greater detail. The print head 56 has a ceramic base plate 58 with a ceramic cover slip 60 thereover which is bonded to it to enclose a plurality of ink ejection chambers 62, in fluid communication with separate, corresponding nozzles 66 and necks 64. While only one set of a chamber, neck and nozzle are shown in dashed line fashion, it will be understood to be typical of the remaining six sets. Unlike plate 58 which has chambers etched in it, the cover slip 60 has only two openings: a large one defining a pulse trap chamber 68 and a valve opening 70. Each of the ceramic plates 58 and 60 may conveniently be made of "Photoceram", a trade name of Corning Glass Corporation, Corning, New York. Overlying the cover slip 60 and bonded thereto are seven piezo-electric crystals 71 - 77. On the underside of the lower plate 58 is an ink supply connector receptacle 78 which fits in opening 70 (FIG. 3). A tube 80 (FIG. 8) connects the ink source 12 to the fitting 78. The end of the tube 80 which connects to the fitting 78 has a construction which is substantially identical to the structural elements 15, 16, 18, 20, 22, 24, 26, 28, 30, 32, 34, and 36, depicted in FIG. 1A and 1B for the ink supply. That is, a needle 18' penetrates a septum 44' contained within the fitting 78 upon the connection of the tube 80. Upon removal of the tube 80 the needle is withdrawn through the septum which reseals the puncture. The open end of the needle 18' is simultaneously covered by a sliding seal similar to the seal 34 to prevent the leakage of ink from the needle or the introduction of air into the needle upon disconnection. Overlying the cover slip 60 at the openings of the pulse trap chamber 68 and the valve opening 70 is a diaphragm 84. Diaphragm 84 is preferably made of a flexible material such as Saran plastic (a trademark of Dow Chemical Company, Midland, Michigan). Diaphragm 84 forms the upper wall of the pulse trap chamber 68. Overlying the diaphragm 84 is a pressure regulator frame 86, preferably made of steel. Frame 86 is conveniently made in an outline generally corresponding to that of diaphragm 84, since both cover the chamber 68 as well as the valve opening 70. Frame 86 has an opening punched out to accommodate opening 70 on the plate 58 and another U-shaped cut to form a long tongue or beam 88. Beam 88 is formed by folding up its sides to make a channel having a long moment arm. The upward movement of beam 88 is limited by a bar 89 attached to the frame 86. The overpressure protection bar 89 is made of steel alloy and is spot-welded to the pulse trap frame. At the base of the beam 88 where it joins to the frame 86 is a strain gauge 90 which serves to measure the strain at that point. A second strain gauge 92, mounted on the frame 86 close to the gauge 90, provides a temperature compensation reference.

As will now be explained, the strain gauge 90 senses the pressure within pulse trap chamber 60. As the ink flows into the pulse trap chamber 60 under pressure, it raises the diaphragm 84 and the beam 88 lying thereover. As the beam 88 raises, it creates a strain on gauge 90 which serves to electrically indicate the pressure within pulse trap chamber 68. The signal from the gauge 92 is used as a temperature compensation reference signal to cancel out any apparent signal caused simply by changes in temperature of the gauges. As strain gauge 90 exhibits strain corresponding to a change in pressure, it generates an electrical signal which, as will be explained in greater detail hereinafter, causes the opening of a gate valve in relation to the pressure being sensed. The gate valve regulates the ink flow through the opening 70. In order for the system to function properly and to provide the best ink flow control, the gate valve which admits ink to the print head must satisfy several critical criteria. It must be light weight, fast acting, and must have absolutely zero leakage when closed. The pressure drop across the valve is very low, and the valve motion itself is extremely small. The valve arrangement shown in FIGS. 2 and 3 achieves these criteria by using a piezo-electrically activated cantilever beam whose sealing force is easily adjusted. The gate valve is comprised of a glass hemisphere plug 94 secured to a valve beam 96, the diaphragm 84 and a seal 82. Beneath the seal 82 is a valve seat 98 through which passes a valve orifice 100. The valve seat 98 is contained in the ink inlet fixture 78. This seat is preferably made of an extremely hard and corrosion resistant material such as ruby. The valve seal 82 is preferably made of a relatively soft material such as silicon rubber, and is attached to the flexible diaphragm 84 which accommodates the motion of the valve. The soft seat provides the required zero leak rate with very little force required. The seat is preferably configured with a small contact surface and no sharp corners which could possibly cut the seal.

The glass hemisphere 94 is positioned on top of the flexible diaphragm 84. The hemisphere accommodates small rotational misalignments between the valve beam 96 and the valve seat 98. A small upward force exerted on the glass hemisphere will open the valve, and a small downward force will close it. If the surfaces of the seat and seal are free of imperfections and properly aligned, the sealing and opening force can be as small as one gram. Since the valve orifice is small (about 0.02 cm), all of the valve components are small and low mass, making quick actuation easily accomplished.

The opening and closing force is provided by the cantilever beam 96 consisting of a piezo-electric crystal 104 bonded to a protruding tongue 102 of the metal base frame. The tongue 102 has a small diameter hole in it to accommodate the glass hemisphere. After the valve is assembled, the hemisphere is bonded to the beam with epoxy. The valve seat can be visually inspected by looking through the hole in the frame since the seal and diaphragm are transparent.

When a voltage is applied to the crystal 104, the curvature of the cantilever beam 96 changes and the end of the cantilever beam on which the hemisphere is mounted raises, opening the valve. When the voltage is removed, the valve returns to its normally closed position. When the plug 94 is raised from the seal 82, ink is permitted to flow out of the orifice 100 into the pulse trap chamber 68 under the diaphragm 84.

The beam 96 is preferably a stainless steel reaction plate which is mounted at each end directly to the base plate 58. The beam 96 has a curved, resilient portion 97 at its end furthest from the valve which acts like a spring hinge in relation to the base plate 58. A valve adjustment screw 101 is threaded through the beam 96 and bears against the cover slip 60 to allow the vertical position of the opposite end of the beam 96 with respect to the valve seal 82 to be adjusted. This permits the sealing force of the valve in the normally closed position to be adjusted. The distance from the adjustment screw 101 to the point of rotation of the frame is much greater than the distance from the valve seal to the point of rotation, providing a sensitive means of adjustment. The adjustment screw may conveniently have 80 threads per inch and be located about three times as far from the rotation point as the valve seal; thus each full rotation of the screw produces about 0.01 cm motion at the valve. The curved spring loop 97 at the end of the frame assures contact between the adjustment screw and the body of the print head, and prevents unwanted motion of the valve frame. The valve frame can conveniently be made of 0.012 cm thick steel, and the piezoelectric crystal can be the same thickness. If the length of the cantilever is 0.8 cm, an end deflection of 0.02 cm can be attained. Since the required motion is only 0.002 cm, the adjustment screw can be tightened so that the beam is deflected 0.018 cm in its normally closed position, providing several grams of sealing force. The entire valve beam is made more compact by structuring the cantilever 'fixed' end to be on the opposite side of the rotation point from the valve orifice, as shown in FIG. 2.

The function of the valve control circuit is to regulate the pressure in the pulse trap chamber, so that ink is supplied to the pressure chambers under the drive crystals under constant pressure conditions, independent of the printing rate, temperature, ink viscosity and other system parameters. As ink is ejected from the nozzles during printing, the capillary forces in the nozzles draw ink from the pulse trap chamber 68 to replace the ejected ink. This reduction in the volume of the pulse trap chamber lowers the pressure slightly and draws the pressure sensor beam 88 downward, increasing the strain in the active strain gauge 90 which increases its resistance slightly. This pressure sensing system is extremely sensitive and accurate, being able to respond to pressure changes as small as 0.01 inch of water, or approximately 2/100,000 atmosphere. The system is protected from damage due to excessive pressures by an overpressure protection beam which limits the motion of the pressure sensor beam, corresponding to approximately ±10 centimeters of water, or about ±1/100 atmosphere. Excess pressures as high as 1 atmosphere can be applied for a short time without damaging the system.

Figure 5:
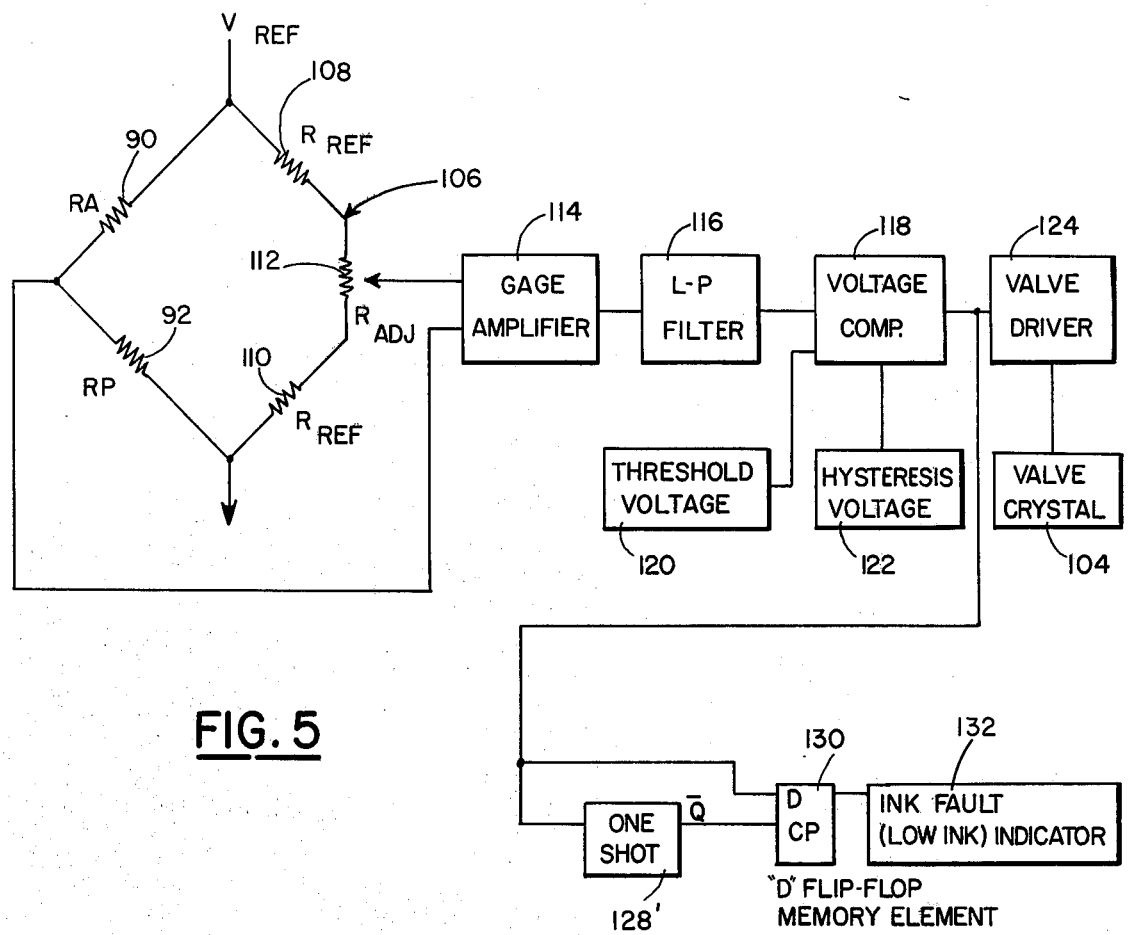
FIG. 5 is a schematic circuit diagram for the control of the operation of the valve and for generating the "out of ink" control signal.

Referring now more particularly to FIG. 5, the control system for the valve will be described. A reference voltage of approximately 5 volts is applied to the strain gauges, which are connected electrically in series as one side of a bridge circuit 106 as shown in FIG. 5. The other side of the bridge circuit is completed by a series connection of two reference resistors 108 and 110 and an intermediate adjustment potentiometer 112, which is set such that when there is no net pressure in the pulse trap and thus no deflection of the pressure sensor beam, the bridge is balanced. Any imbalance of the bridge circuit (due to pressure changes) appears as a difference signal between the moving contact of the potentiometer 112 and the common node of the strain gauges 90 and 92 which is amplified by an amplifier 114 and is filtered in a low pass filter 116 to eliminate high frequency noise.

The filtered and amplified strain gauge signal (bridge imbalance) is fed into a voltage comparator 118 and compared with an adjustable threshold voltage from a source 120. As the print head ejects droplets, the pulse trap pressure falls steadily and the gauge signal falls proportionately. When the gauge signal falls below the threshold voltage minus a hysteresis voltage from a source 122, the voltage comparator sends a signal to a valve driver 124 to open the pulse trap chamber valve by applying an appropriate voltage to the valve crystal 104.

With the valve open, ink flows from the ink cartridge 12 into the pulse trap chamber 68 faster than ink is being ejected from the nozzles 66, raising the pressure and the gauge signal. When the gauge signal exceeds the threshold voltage plus the hysteresis voltage, the voltage comparator 118 sends a signal to the valve driver 24 to close the valve. In this manner the pressure chambers 62 under the drive crystals 71 – 77 are always supplied with exactly the right amount of ink to replace ink that has been ejected. The threshold voltage source 120 can be set at any value, and thus the pressure in the pulse trap can be set at will, within the physical constraints of the printer. Likewise, the hysteresis voltage source 122 can be set at any value, with the lower limit being determined by the stability of the control system. Convenient values of threshold pressure and hysteresis are $-5$ cm $H_2O$ and $0.1$ cm $H_2O$ respectively.

Since the volume flow is very small and the valve must operate quickly, the valve orifice 100 is also small (about 0.002 cm). Fluid flow through such a small opening is normally viscosity limited—that is, the fluid velocity in the valve quickly reaches a limiting value where the viscous forces will balance the driving pressure force generated by the ink container 12. The total flow rate through the valve is then proportional to the pressure in the ink container 12.

As the pressure in the ink container 12 decreases, the flow rate through the valve decreases, and the time required to refill the pulse trap 68 increases, as shown by curve 126 in FIG. 6. In the limiting case of an empty ink supply, the valve would remain open continually. If the print head were allowed to operate in this condition, the pressure in the pulse trap 68 would continue to fall until it reached a value equal to the maximum negative capillary pressure in the nozzles. At that point, the nozzles could no longer be refilled from the pulse trap chamber, and air would enter the nozzles, preventing further drops from being ejected. Such a failure is difficult to correct, and can be avoided only if the ink container is replaced before the pressure falls to such low levels.

To prevent this from occurring, the printer is supplied with an electronic circuit that prevents print head failures due to running out of ink. A maximum allowable valve pulse length is empirically determined, and this value is electronically compared to the actual valve pulse each time the valve opens. In FIG. 5, when a valve pulse is initiated by the voltage comparator 118, a one-shot multivibrator 128 is simultaneously triggered and the comparator signal is also fed to the D input of a D type flip-flop 130. The one-shot is set to a delay time equal to the maximum allowable pulse length. At the end of this delay the status of the flip-flop memory element 130 is checked by supplying its output to the CP(Clock Pulse) input which reveals if the valve is still open by going true if the valve signal is still being applied to the D input. If the valve is open, an error signal is generated to a 'low ink' indicator 132. The error signal can be acted on in several different ways, but a necessary condition is that the maximum print rate be significantly reduced. For example, if the print rate, (and hence flow through the valve) is reduced to ⅓ of its normal value, the valve pulse length will drop to below the maximum allowable pulse length, and printing at this slow rate can continue for some time, allowing the operator to choose a convenient time to replace the ink cartridge. Alternatively, if the printing is immediately stopped, the information being printed must be stored until the ink cartridge is replaced.

In one preferred embodiment of the invention, typical values of the parameters described above are as follows:

| TYPICAL INK SUPPLY SYSTEM PARAMETERS | |
|---|---|
| Ink Container Volume | 100 cc. |
|   initial pressure | 0.4 atm |
|   'cut-off' pressure | 0.1 atm |
| Valve Pulse Length | 10 millisecond |
|   opening time | 1 millisecond |
|   'cut-off' pulse length | 50 millisecond |
|   maximum opening | 0.002 cm |
| Pulse Trap Pressure | $-5$ cm $H_2O$ |
|   hysteresis pressure | 0.1 cm $H_2O$ |
|   hysteresis volume | .0002 cc |
| Ink Viscosity | 6 centipoise |
|   surface tension | 50 dyne/cm |
| Nozzle Capillary Pressure | 15 cm $H_2O$ |

The ink supply system of the invention consisting of the relatively high pressure ink source, the regulating valve, and the pressure sensor system with overpressure protection, is also uniquely suited for eliminating air bubbles that may enter the print head due to shock, vibration or other malfunction. The average duty cycle of the valve is typically quite small, even at the low pressure cut-off point. Thus, if the valve is opened fully, the total volume flow through the nozzles can be much larger than during the droplet ejection process, and is always unidirectional from the pulse trap towards the nozzles. Hence, to eliminate air bubbles, the valve is initially opened fully for a relatively long period of time (several seconds), allowing a relatively large volume of ink to flow through the print head and to flush out the bubbles. The ink flowing through the nozzles is then collected and disposed of, returning the head to its original 'print-ready' condition.

Figure 7:
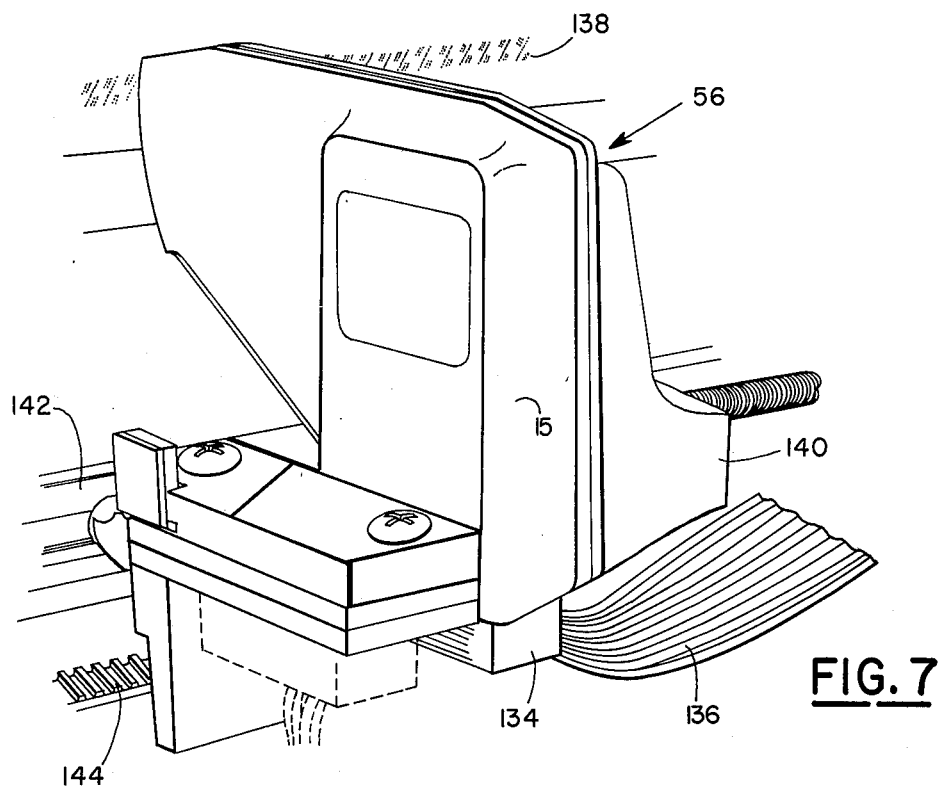
FIG. 7 is an enlarged, perspective view, of the print head of the present invention as mounted on the carriage assembly.
Figure 8:
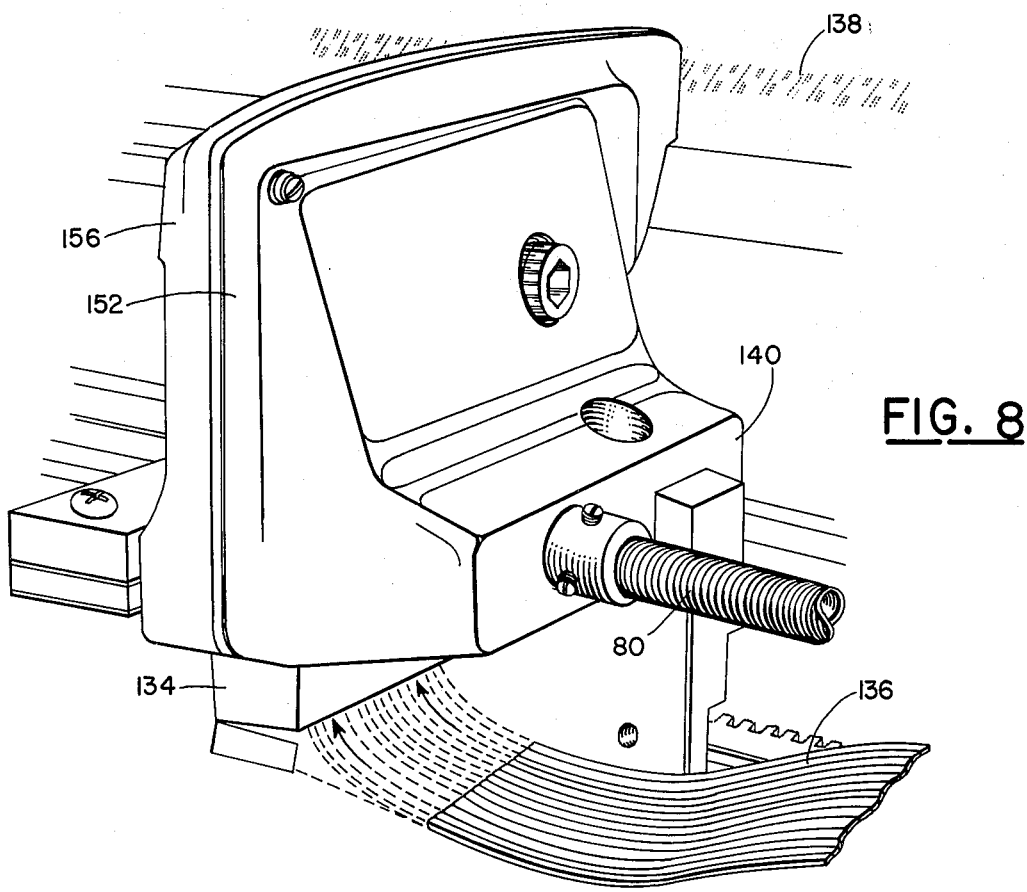
FIG. 8 is a second, enlarged, perspective view of the print head depicted in FIG. 7.

Referring now more particularly to FIGS. 2, 7 and 8 the print head 56 of the invention will be discussed. An electronic pulse generator (not shown) applies pulses to the printing head through an electrical connector 134 and a flat cable 136. Upon receiving an electronic pulse from the pulse generator the printing head 56 discharges and projects a single discrete droplet of printing fluid from an orifice as is more completely described in co-pending U.S. application Ser. No. 489,985, filed July 19, 1974, and assigned to the same assignee of the present application. Each electrical pulse produces a single droplet, independently of any previous signal. The print head contains several droplet ejection means, typically seven droplet injectors in a vertical column, any of which can be independently actuated. The electronic pulse generator does not operate at a resonant frequency, but rather calls for a droplet according to a predetermined pattern to be printed.

For accurate recording of the information on a recording medium 138, a substantially straight trajectory for the ink droplets is followed from the orifice on the printing head to the recording medium. In this manner, careful positioning of the recording medium relative to the apparatus results in impingement of droplets in a predictable pattern according to signals generated by the electronic pulse generator, which signals are determined by the information to be printed. For the best recording of information, the droplet should be of a precise and predictable shape and volume. That is, each droplet must closely follow the electronic signals from the electronic pulse generator so that equally spaced uniform signals give equally spaced uniform droplets.

The droplet is discharged from the head 56 by the sudden reduction of volume in the chamber 62. This sudden reduction in volume is accomplished by deflecting a plate (not shown) into the chamber to displace a sufficient amount of ink to form a droplet. The deflection of the plate is caused by the activation of one of the crystals 71 - 77 as is more fully explained in the copending patent application referred to above. The deflection must be sudden enough to impart sufficient kinetic energy to the fluid in the nozzle 66 to accelerate a portion of the fluid beyond the escape velocity. The escape velocity is the minimum velocity which will cause a plug of ink extending from the nozzle 66 to separate from the nozzle and form a free droplet.

This process of droplet ejection is critically dependent upon the fact that the print head is completely filled with ink and that no air bubbles are trapped in the head. Moreover, no air bubbles may be allowed to enter either through the ink inlet or through the nozzles. The ink supply system is designed to supply maximum assurance that no air is introduced into this system, as is more fully explained above.

As was described above, the print head ink connection fixture contains a fine mesh filter 99 and an elastomeric septum 44'. When the print head is installed, the ink supply needle penetrates the septum, delivering ink into the connection fixture. Should any small gas bubbles be inadvertently introduced during installation, the fine mesh filter will prevent them from entering the print head 56. A convenient pore size for the filter is 5 microns ($5 \times 10^{-6}$ meters). To further insure that no air bubbles will enter the ink supply system, the system is first purged with $CO_2$ to remove the air. It is next purged with sodium hydroxide to absorb the $CO_2$. The system is thereafter purged with ink (without the dye) which removes the sodium hydroxide.

Since it is desired to make the print head 56 readily replaceable, it is removably mounted in a carriage mount 140 which travels on a pair of rails 142 horizontally and spaced apart from the print receiving medium 138. The carriage mount 140 is moved across the rails 142 by means of a toothed drive belt 144. The carriage mount moves across the surface of the paper as the head 56 ejects droplets to form the characters on the print receiving medium.

Attached to the carriage mount is a receptacle 146 for the ink supply fitting 78 on the head 56. The receptacle 146 contains a small needle 18', shown in hidden line fashion, for penetrating the septum 44' on the head. The needle 18' should be as small as possible to avoid damaging the septum and still provide low resistance to fluid from the ink container. A needle with an outside diameter of 1 millimeter has been found to be satisfactory. After the print head is installed on the carriage mount 140, and the needle 18' has penetrated the septum 44', as described above, the head 56 is rotated about the needle 18' to adjust the spacing between the print head and the print receiving medium 138. After the correct spacing has been obtained, the head 56 is fixed in place with respect to the carriage mount 140 by means of a mechanical attachment such as a screw 148 which passes through an enlarged hole 150 in the carriage mount 140 to be threadably received and engaged in a hole 152 in the head 56. In this way, no stress is carried by either the needle or the septum.

As mentioned above, the head mount receptacle contains a moveable seal and spring, not shown, which are positioned over the needle when the print head is removed. This protects the needle from contamination, prevents ink from leaking, and prevents air from entering the system. The seal can be made from many elastomeric materials, with requirements similar to those of the septum. Urethane rubbers or butyl rubbers have been found to be particularly suitable.

The needle 18' is connected to the flexible ink supply line 80 which conducts ink from the ink receptacle 12 to the head 56. The tubing must support the full ink supply pressure (approximately 0.5 atmosphere gauge) for the life of the printer. The line also must have a low vapor transmission property to minimize evaporation, fogging, and potential air bubble generation. The line must also remain flexible, since it is the connection link between the fixed ink cartridge receptacle 12 and moving head mount 140. In particular, "Tygon" tubing with an inside diameter of approximately 1 millimeter has been found to be satisfactory. "Tygon" is a trademark of the Norton Company of Akron, Ohio, for extruded plasticized polyvinyl chloride tubing.

In order to make the electrical interconnection to the print head, the print head is provided with a protruding portion 148 which is integral with the print head and constitutes an extension of one side thereof. A plurality of electrical traces 150 are screened onto the protrusion 148 and are connected in printed circuit fashion to the various crystals controlling the droplet ejection chambers, the pressure sensor and the valve opener. The protrusion 148 constitutes a plug which is received in a corresponding electrical receptacle 134 carried by the carriage 140. A flat cable 136 is connected between the receptacle 134 and the electronic circuitry (not shown) for operating the print head. In this way, the print head 56 is interchangeable in the carriage mount 140 by means of the readily removeable mechanical, fluid and electrical connections.

Figure 9:
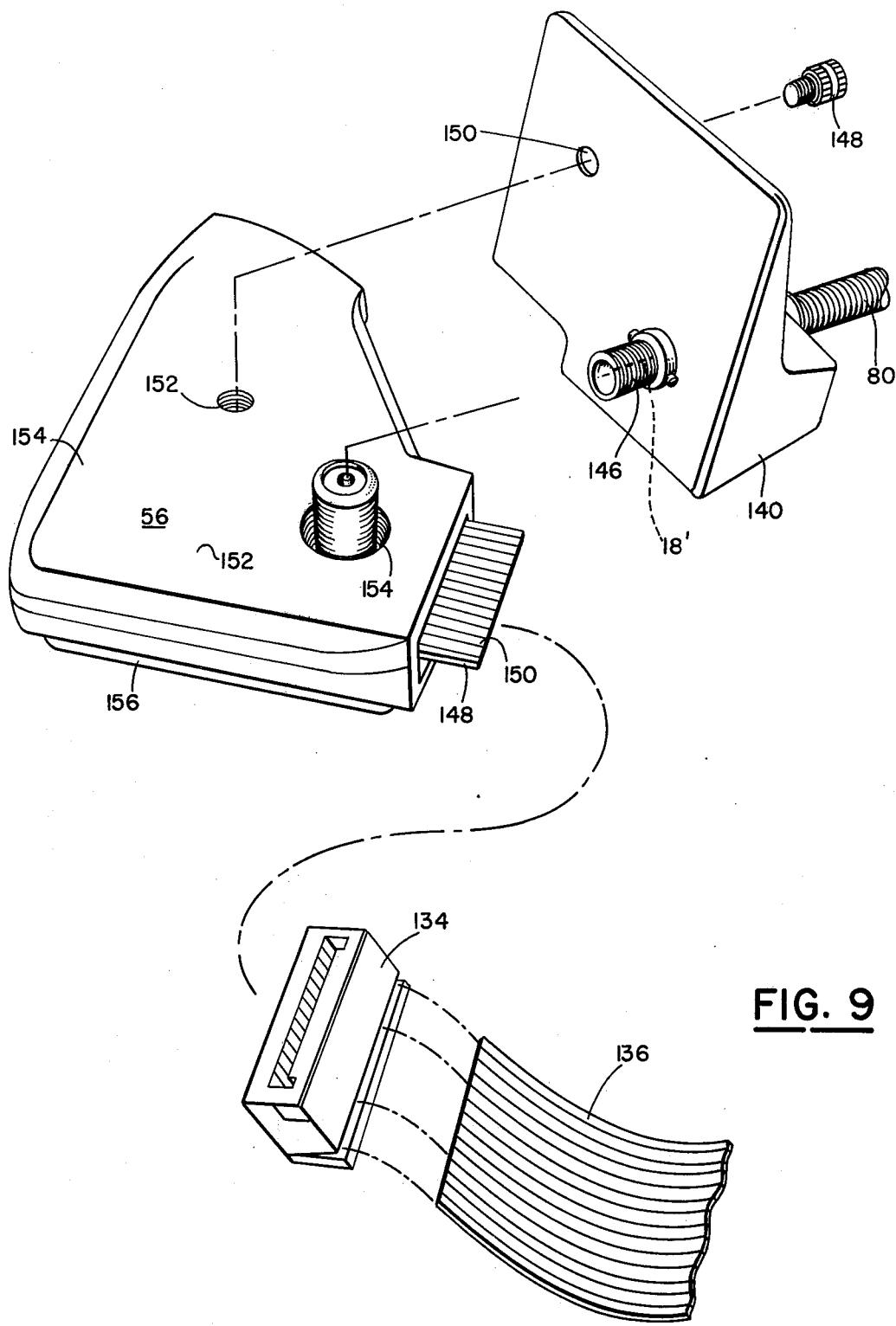
FIG. 9 is an exploded, perspective view, of the print head and mounting structure depicted in FIGS. 7 and 8.

A print head constructed according to this disclosure weighs approximately 7 grams, is easily installed and provides reliable operation. However, several components are extremely delicate and easily damaged. Further, the flat configuration of the head which is so convenient for electrical connection acts as an amplifier for the crystal vibrations and can be noisy. These problems are overcome by encasing the head in a container which provides for dissipation of the structural vibrations and protects the head from damage. The head container structure is shown in FIGS. 7, 8, and 9.

In the head assembly process, the completed head 56 is coated with a thin insulating layer of varnish. The back of the head is then attached to a head cover base 152 with an extremely viscous non-volatile compound such as vacuum grease. The ink inlet 78 on the head is inserted through a hole 154 provided in the base 152. The drive crystal area of the print head is then coated with a relatively thick layer (about 0.05 cm thick) of a suitable vibration damping material.

A matching head cover front 156 is then pressed on, making intimate contact with the sound damping material. The head cover front 156 and base 152 are sealed together using a silicon sealant. The resultant head assembly can be easily handled without danger of damage to the sensitive components mounted on the head, and the head is almost noiseless in operation. The head is easily removed from the printer by unplugging the edge connector 134 from the electrical connection lip 148 on the head 56, and withdrawing the head from the head receptacle and ink inlet needle 146. This installation/removal process can be carried out repeatedly without necessitating adjustments or checkout procedures.

In order to make each print head unit completely interchangeable with any other print head unit, certain electrical adjustments must be made. In co-pending patent application Ser. No. 489,985, it is described how the velocity of drops from each of the seven channels can be made equal by proper selection of series resistors for each of the drive crystals. Thus seven resistors must be provided to balance the droplet velocities.

As described above, variations in strain gauge resistances and mechanical assembly tolerances require that an electrical adjustment be made to assure that the valve opens at the correct pressure level. This adjustment is shown as a variable resistance in FIG. 5. Once the value of this resistance has been determined, a discrete resistor is selected to fix the valve pressure threshold. Variations in assembly tolerances also require that the width of the drive pulse to the drive crystals be selected individually for each print head. Typically the variation between crystals in any given head is small, so that all seven may be driven with the same pulse width. The pulse width can be controlled by various means, most of which can be adjusted by selecting a specific resistance value.

Thus there are 9 discrete resistors required to adjust the electronic inputs to the print head. The print head unit, consisting of the print head 56 and the 9 discrete resistors, is then completely interchangeable with any other print head unit. The 9 resistors are conveniently packaged in the socket module 134. This resistance module is electrically, and removable connected to the print head, print head drive electronics, or connecting cables in order to provide its required function.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. An improved ink jet printer of the type having an ink supply, an asynchronous, volume displacement droplet ejection print head in fluid communication with the ink supply, the print head having at least one droplet ejecting nozzle and carriage means for effecting relative movement between the print head and a print receiving medium, wherein the improvement comprises:
   first means for removably attaching the print head to the carriage means, including means for adjustably spacing the print head from the print receiving medium,
   second means integral with the first means for removably connecting the print head to the ink supply, the second means including means for blocking the introduction of air into and the loss of ink from the print head upon its removal from the carriage means,
   third means integral with the first and second means for providing a removable electrical interconnection with the print head, and wherein each print head includes preadjusted electrical signal conditioning means for adapating each print head to operate within predetermined system parameters when supplied with predetermined electrical signals through the third means.

2. An improved ink jet printer as recited in claim 1, wherein the print head includes a containment structure and the second means comprise a pliable septum mounted in the containment structure on the print head, a hollow needle integrally mounted on the first means, a movable seal, a housing surrounding the hollow needle and seal, resilient means for effecting relative movement between the seal and the needle to position the seal to cover the open end of the needle when the print head is removed from the first means, whereby when the print head and containment structure are pressed against the housing, the movable seal is displaced to expose the pointed end of the hollow needle, the needle penetrating the pliable septum and allowing ink to flow into the containment structure and print head.

3. An improved ink jet printer as recited in claim 2, wherein the means for adjustably spacing the print head from the print receiving medium comprise means for rotatably mounting the print head and containment structure about the hollow needle and means for fixing the relative rotational position of the print head and containment structure about the hollow needle whereby the spacing between the print head and the print receiving medium can be adjustably fixed.

4. An improved ink jet printer as recited in claim 1, wherein the third means compise an edge connector integral with the print head, the edge connector including a plurality of thick-filmed electrical traces screened onto the print head structure, an edge connector socket mounted on the first means for establishing an electrical connection to the electrical traces on the edge connector of the print head, and means connecting the edge connector socket with the pre-adjusted electrical signal conditioning means.

5. An improved ink jet printer as recited in claim 1, wherein the print head further includes a pressure sensor and a valve, the pressure sensor detecting changes in the fluid pressure in the ink supply and operating the valve to supply ink to the print head upon reduction of the pressure in the ink supply system below a predetermined level.

6. An improved ink jet printer of the type having an ink supply, an asynchronous, volume displacement droplet ejection print head in fluid communication with the ink supply, the print head having at least one droplet ejecting nozzle and carriage means for effecting relative movement between the print head and a print receiving medium, wherein the improvement comprises a supply of degassed, liquid ink, a collapsible container for said ink, the container maintaining the ink in its gas-free state during storage, interchange of containers, and utilization in the ink jet printer, a receptacle for the collapsible container, the receptacle removably receiving the container, a supply line for providing fluid communication between the receptacle and the print head, means within the receptacle for providing fluid communication between the interior of the collapsible container when it is inserted into the receptacle and the ink supply line and for closing off the ink supply line and the receptacle to both fluid and gas when the container is removed from the receptacle, the print head including valving means for controlling the flow of ink from the supply line into the print head, means for sensing the pressure of the ink within the print head and wherein the valving means separates the pressure sensing means from the pressure of the ink supply within the collapsible container, control means connected to the pressure sensing means to control the opening and closing of the valving means, and further including ink level detection means for sensing when the ink container is no longer capable of supplying ink at a rate adequate for printing by the print head, the ink level detection means including means for sensing the control signal to the valving means and for producing a low ink indicating signal whenever the frequency of the control signal to the valving means exceeds a predetermined value, thereby indicating that the collapsible ink container must be replaced.

7. An improved ink jet printer of the type having an ink supply, an asynchronous, volume displacement droplet ejecting print head in fluid communication with the ink supply, the print head having at least one droplet ejecting nozzle and carriage means for effecting relative movement between the print head and a print receiving medium, wherein the improvement comprises a supply of degassed, liquid ink, a collapsible container for said ink, the container maintaining the ink in its gas-free state during storage, interchange of containers, and utilization in the ink jet printer, a receptacle for the collapsible container, the receptacle removably receiving the container, a supply line for providing fluid communication between the receptacle and the print head, means with the receptacle for providing fluid communication between the interior of the collapsible container when it is inserted into the receptacle and the ink supply line for closing off the ink supply line and the receptacle to both fluid and gas when the container is removed from the receptacle, the print head including valving means for controlling the flow of ink from the supply line into the print head, means for sensing the pressure of the ink within the print head and wherein the valving means separates the pressure sensing means from the pressure of the ink supply within the collapsible container, control means connected to the pressure sensing means to control the opening and closing of the valving means, and ink level detecting means for detecting when the ink container is no longer capable of supplying ink at a rate adequate for printing by the print head, the ink level detection means including means for sensing the duration of the control signal to the valving means and comparing this duration with a pre-set value, and producing a low ink level indicating signal whenever the duration of the valving control signal exceeds the pre-set value and further including means for disarming the ink jet printer whenever the low ink level indicating signal is present.

* * * * *